US012779573B2

(12) United States Patent
Andersson et al.

(10) Patent No.: US 12,779,573 B2
(45) Date of Patent: Nov. 3, 2026

(54) CONTROLLING ON-TIME OF PWM APPLIED TO POWER BLOCKS IN WELDING SYSTEM

(71) Applicant: The ESAB Group, Inc., North Bethesda, MD (US)

(72) Inventors: Philip Magnus Andersson, Floda (SE); Lars David Leif Juliusson, Västra Frölunda (SE)

(73) Assignee: THE ESAB GROUP, INC., North Bethesda, MD (US)

( * ) Notice: Subject to any disclaimer, the term of this patent is extended or adjusted under 35 U.S.C. 154(b) by 840 days.

(21) Appl. No.: 18/194,838

(22) Filed: Apr. 3, 2023

(65) Prior Publication Data

US 2024/0326149 A1 Oct. 3, 2024

(51) Int. Cl.

*B23K 9/095* (2006.01)
*B23K 9/09* (2006.01)
*G05B 11/42* (2006.01)

(52) U.S. Cl.

CPC ............ *B23K 9/0953* (2013.01); *B23K 9/092* (2013.01); *B23K 9/093* (2013.01); *G05B 11/42* (2013.01)

(58) Field of Classification Search

CPC ...... B23K 9/0953; B23K 9/092; B23K 9/093; G05B 11/42; H02M 7/53871; H02M 7/5395

See application file for complete search history.

(56) References Cited

U.S. PATENT DOCUMENTS

| | | | | |
|---|---|---|---|---|
| 4,384,187 | A * | 5/1983 | Jackson | B23K 9/092 219/130.21 |
| 4,384,188 | A * | 5/1983 | Wright, Jr. | B23K 9/092 219/130.51 |
| 4,403,135 | A * | 9/1983 | Moyer | B23K 9/091 219/130.21 |
| 4,521,671 | A | 6/1985 | Fronius | |
| 4,521,672 | A | 6/1985 | Fronius | |

(Continued)

FOREIGN PATENT DOCUMENTS

| | | |
|---|---|---|
| CN | 105337501 A | 2/2016 |
| CN | 112548271 A | 3/2021 |

(Continued)

OTHER PUBLICATIONS

Notification of Transmittal of the International Search Report and Written Opinion for International Patent Application No. PCT/US2024/018463 mailed Jul. 8, 2024, 13 pages.

*Primary Examiner* — Ryan C Clark

(74) *Attorney, Agent, or Firm* — Edell, Shapiro & Finnan, LLC

(57) ABSTRACT

A method of controlling pulse width modulation (PWM) applied to at least one power inverter to generate a weld current for cutting or welding comprises: receiving current values indicative of the weld current during a cycle of the PWM; receiving a target current value indicative of a target current for the weld current; during the cycle, turning ON a pulse to energize the at least one power inverter; and after turning ON the pulse, repeating multiple times during the cycle: determining whether to adjust an on-time of the pulse based on the current values and the target current value in order to drive the weld current toward the target current; and adjusting the on-time responsive to determining.

20 Claims, 10 Drawing Sheets

(56) References Cited

U.S. PATENT DOCUMENTS

| | | | | |
|---|---|---|---|---|
| 5,036,176 | A | 7/1991 | Yamaguchi et al. | |
| 5,086,382 | A | 2/1992 | Feldtkeller et al. | |
| 5,224,028 | A | 6/1993 | Lipman | |
| 5,225,658 | A | 7/1993 | Yamaguchi et al. | |
| 5,278,390 | A | 1/1994 | Blankenship | |
| 5,444,356 | A | 8/1995 | Reynolds et al. | |
| 5,615,095 | A | 3/1997 | Reynolds et al. | |
| 5,710,696 | A | 1/1998 | Reynolds et al. | |
| 5,844,197 | A | 12/1998 | Daniel | |
| 5,847,354 | A | 12/1998 | Daniel | |
| 6,114,655 | A | 9/2000 | Reynolds | |
| 6,278,081 | B1 | 8/2001 | Reynolds | |
| 6,369,350 | B1 | 4/2002 | Norris | |
| 6,498,321 | B1 | 12/2002 | Fulmer et al. | |
| 6,794,601 | B2 | 9/2004 | Norris et al. | |
| 6,849,828 | B2 | 2/2005 | Aigner | |
| 7,049,545 | B2 | 5/2006 | Matus et al. | |
| 7,105,773 | B2 | 9/2006 | Myers et al. | |
| 7,166,817 | B2 | 1/2007 | Stava et al. | |
| 7,173,214 | B2 | 2/2007 | Nadzam et al. | |
| 7,304,269 | B2 | 12/2007 | Fulmer et al. | |
| 7,733,679 | B2 | 6/2010 | Luger et al. | |
| 7,767,933 | B2 | 8/2010 | Matus et al. | |
| 7,842,903 | B2 | 11/2010 | Myers | |
| 8,203,099 | B2 | 6/2012 | Peters et al. | |
| 8,242,410 | B2 * | 8/2012 | Peters | B23K 26/0676 219/121.64 |
| 8,283,598 | B2 | 10/2012 | Fulmer et al. | |
| 8,373,093 | B2 | 2/2013 | Peters | |
| 8,389,898 | B2 | 3/2013 | Aigner | |
| 8,426,772 | B2 | 4/2013 | Luo | |
| 8,455,794 | B2 | 6/2013 | Vogel | |
| 8,519,302 | B2 | 8/2013 | Myers et al. | |
| 8,546,726 | B2 | 10/2013 | Vogel | |
| 8,598,491 | B2 | 12/2013 | Peters | |
| 8,653,413 | B2 | 2/2014 | Vogel | |
| 8,692,157 | B2 | 4/2014 | Daniel et al. | |
| 8,704,130 | B2 | 4/2014 | Luo | |
| 8,704,135 | B2 | 4/2014 | Narayanan et al. | |
| 8,759,715 | B2 | 6/2014 | Narayanan et al. | |
| 8,829,869 | B2 | 9/2014 | Kooken et al. | |
| 8,884,188 | B2 | 11/2014 | Vogel | |
| 8,895,896 | B2 | 11/2014 | O'Donnell et al. | |
| 8,937,267 | B2 | 1/2015 | Peters | |
| 8,952,291 | B2 | 2/2015 | Hillen et al. | |
| 8,952,293 | B2 * | 2/2015 | Vogel | H02M 3/3353 219/130.1 |
| 8,993,927 | B2 | 3/2015 | Peters | |
| 9,006,609 | B2 | 4/2015 | Stava et al. | |
| 9,095,929 | B2 | 8/2015 | Peters | |
| 9,144,856 | B2 | 9/2015 | Vogel | |
| 9,266,194 | B2 | 2/2016 | Hillen et al. | |
| 9,302,342 | B2 | 4/2016 | Scholz et al. | |
| 9,308,597 | B2 | 4/2016 | Matus et al. | |
| 9,333,580 | B2 | 5/2016 | Narayanan et al. | |
| 9,393,635 | B2 | 7/2016 | Peters et al. | |
| 9,415,458 | B2 | 8/2016 | Doyle et al. | |
| 9,492,880 | B2 | 11/2016 | Vogel | |
| 9,539,661 | B2 | 1/2017 | Manthe | |
| 9,579,742 | B2 | 2/2017 | O'Donnell et al. | |
| 9,662,736 | B2 | 5/2017 | Peters | |
| 9,731,372 | B2 | 8/2017 | O'Donnell et al. | |
| 9,737,950 | B2 | 8/2017 | Vogel | |
| 9,895,760 | B2 | 2/2018 | Peters | |
| 9,956,638 | B2 | 5/2018 | Narayanan et al. | |
| 10,427,237 | B2 | 10/2019 | Ulrich et al. | |
| 10,688,583 | B2 | 6/2020 | Smith et al. | |
| 10,910,937 | B2 | 2/2021 | Nelson | |
| 11,014,182 | B2 | 5/2021 | Henry | |
| 11,097,368 | B2 | 8/2021 | Vogel | |
| 2007/0102406 | A1 | 5/2007 | Stava et al. | |
| 2007/0221643 | A1 | 9/2007 | Narayanan et al. | |
| 2008/0011727 | A1 | 1/2008 | Peters | |
| 2008/0190906 | A1 | 8/2008 | Aigner | |
| 2013/0264323 | A1 | 10/2013 | Daniel | |
| 2014/0209590 | A1 | 7/2014 | Narayanan et al. | |
| 2014/0376268 | A1 * | 12/2014 | Manthe | H02M 3/285 363/17 |
| 2015/0196969 | A1 | 7/2015 | Peters | |
| 2015/0217404 | A1 | 8/2015 | Peters | |
| 2018/0050412 | A1 | 2/2018 | Kadlec et al. | |
| 2018/0056427 | A1 * | 3/2018 | Forslund | B23K 9/0956 |
| 2018/0304393 | A1 | 10/2018 | Vogel et al. | |
| 2019/0190403 | A1 * | 6/2019 | Furukawa | H02M 7/5395 |
| 2019/0372451 | A1 * | 12/2019 | Nelson | H02M 1/08 |
| 2019/0381597 | A1 * | 12/2019 | Miyajima | B23K 9/1062 |
| 2020/0316705 | A1 | 10/2020 | Smith et al. | |
| 2021/0039186 | A1 * | 2/2021 | Vogel | B23K 9/1075 |
| 2021/0252623 | A1 | 8/2021 | Harrysson et al. | |
| 2022/0118542 | A1 | 4/2022 | Wang et al. | |

FOREIGN PATENT DOCUMENTS

| | | | | |
|---|---|---|---|---|
| CN | 114905118 | A * | 8/2022 | B23K 9/067 |
| DE | 202013011884 | U1 | 1/2015 | |
| EP | 2942142 | B1 | 7/2019 | |
| EP | 3869676 | A1 | 8/2021 | |

* cited by examiner

CONTROLLING ON-TIME OF PWM APPLIED TO POWER BLOCKS IN WELDING SYSTEM

TECHNICAL FIELD

The present disclosure relates to pulse width modulation applied to power inverters in a welding system.

BACKGROUND

Inverter-based welding and cutting power supplies typically control the power in a welding operation by dynamically adjusting the pulse width modulation (PWM) applied to a power inverter based on feedback indicating welding current and voltage levels during a welding/cutting operation. The power inverter comprises a set of high-speed semiconductor switching devices that are switched on and off at a switching frequency of the PWM to create a current that is supplied to a welding/cutting apparatus through a transformer. A conventional technique for controlling the PWM computes fixed on-times of cycles of the PWM on a per cycle basis, i.e., only once per cycle, and in advance of the cycles. For example, the conventional technique may perform the following sequence of operations: (1) pre-compute a first fixed on-time prior to a first cycle, and then generate the first cycle with the first fixed on-time; (2) pre-compute a second fixed on-time prior to a second cycle, and then generate the second cycle with the second fixed on-time; and so on, for subsequent cycles. Thus, during each cycle, the pre-computed fixed on-time cannot be adjusted dynamically to accommodate a change in demand on the welding current during each cycle. For example, the conventional technique cannot increase or decrease the on-time dynamically during each cycle to accommodate a corresponding demand to increase or decrease the welding current during each cycle. This results in a sluggish response time to a demand to increase or decrease the welding current, which negatively impacts the welding process.

DESCRIPTION OF EXAMPLE EMBODIMENTS

Overview

In an embodiment, a method of controlling pulse width modulation (PWM) applied to at least one power inverter to generate a weld current for cutting or welding comprises: receiving current values indicative of the weld current during a cycle of the PWM; receiving a target current value indicative of a target current for the weld current; during the cycle, turning ON a pulse to energize the at least one power inverter; and after turning ON the pulse, repeating multiple times during the cycle: determining whether to adjust an on-time of the pulse based on the current values and the target current value in order to drive the weld current toward the target current; and adjusting the on-time responsive to determining.

Example Embodiments

Figure 1:
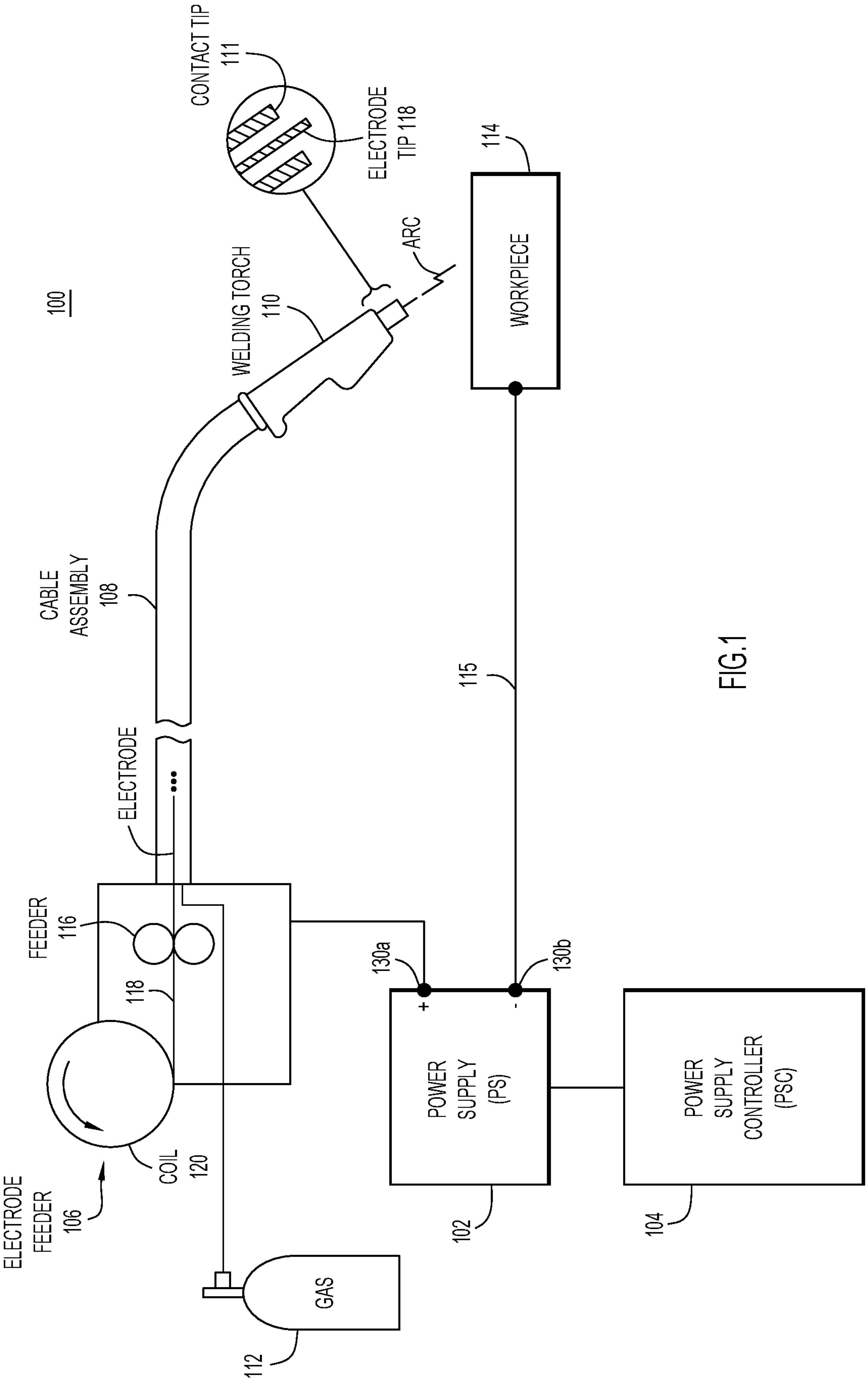
FIG. 1 is an illustration of an example welding system in which embodiments directed to controlling an on-time of PWM may be implemented.

With reference to FIG. 1, there is an illustration of an example metal inert gas (MIG)/metal active gas (MAG) welding system 100, in which embodiments directed to controlling an on-time of PWM applied to a welding power supply configured to generate a weld current for a welding or cutting operation may be implemented. The embodiments are presented in the context of MIG/MAG welding by way of example only. It is understood that the embodiments may be employed generally in any known or hereafter developed welding environments, such as, but not limited to, tungsten inert gas (TIG) welding, flux cored arc welding (FCAW), shielded metal arc welding (SMAW) or stick welding, submerged arc welding (SAW), and so on. Additionally, the embodiments may be employed equally in an arc cutting apparatus. Welding system 100 includes: a power supply 102; a power supply controller (PSC) 104 coupled to and configured to control the power supply; an electrode feeder 106 coupled to the power supply; a cable assembly 108 coupled to the electrode feeder; a welding torch 110 (also referred to as a “welding gun”) coupled to the cable assembly and having a sturdy metal contact tip 111 that extends from an end of the welding gun or torch; a gas container 112 coupled to the cable assembly; and a workpiece 114 coupled to the power supply through at least a return path/cable 115. In the ensuing description, the terms “weld” and “welding” are synonymous and interchangeable. Also, the terms “weld” and “welding” refer broadly to both welding and plasma cutting systems and operations.

Electrode feeder 106 includes an electrode feeder 116 to feed an electrode from a coiled electrode 120 through cable assembly 108 and through contact tip 111 of welding torch 110, which is in electrical contact with the electrode. Under control of PSC 104, power supply 102 generates weld power that drives the welding process/operation. In welding operations that involve a pulsed or periodic waveform, the weld power typically includes a series of weld current pulses. Power supply 102 provides the weld power from an output terminal 130*a* of the power supply to the electrode, through electrode feeder 116, cable assembly 108, and welding torch 110, while the cable assembly also delivers a shielding gas from gas container 112 to the welding torch. Return path/cable 115 provides an electrical return path from workpiece 114 to an input terminal 130*b* of power supply 102.

During a welding operation, an electrode tip 118 of the electrode is brought into contact or near contact with workpiece 114, and the weld power (i.e., current and voltage) supplied by power supply 102 to the welding torch creates an arc between workpiece 114 and electrode tip 118 (also referred to as an "electrode stick") extending through the contact tip. To control the welding process, PSC 104 controls power supply 102 to generate the weld power (e.g., current) at a desired level for the welding process, based on feedback in the form of measurements of the current and voltage (e.g., arc voltage) supplied by the power supply to the welding process. The measurements may be produced by current and voltage sense points in power supply 102 and/or at sense points that are remote from the power supply, such as in cable assembly 108 or welding torch 110.

Figure 2:
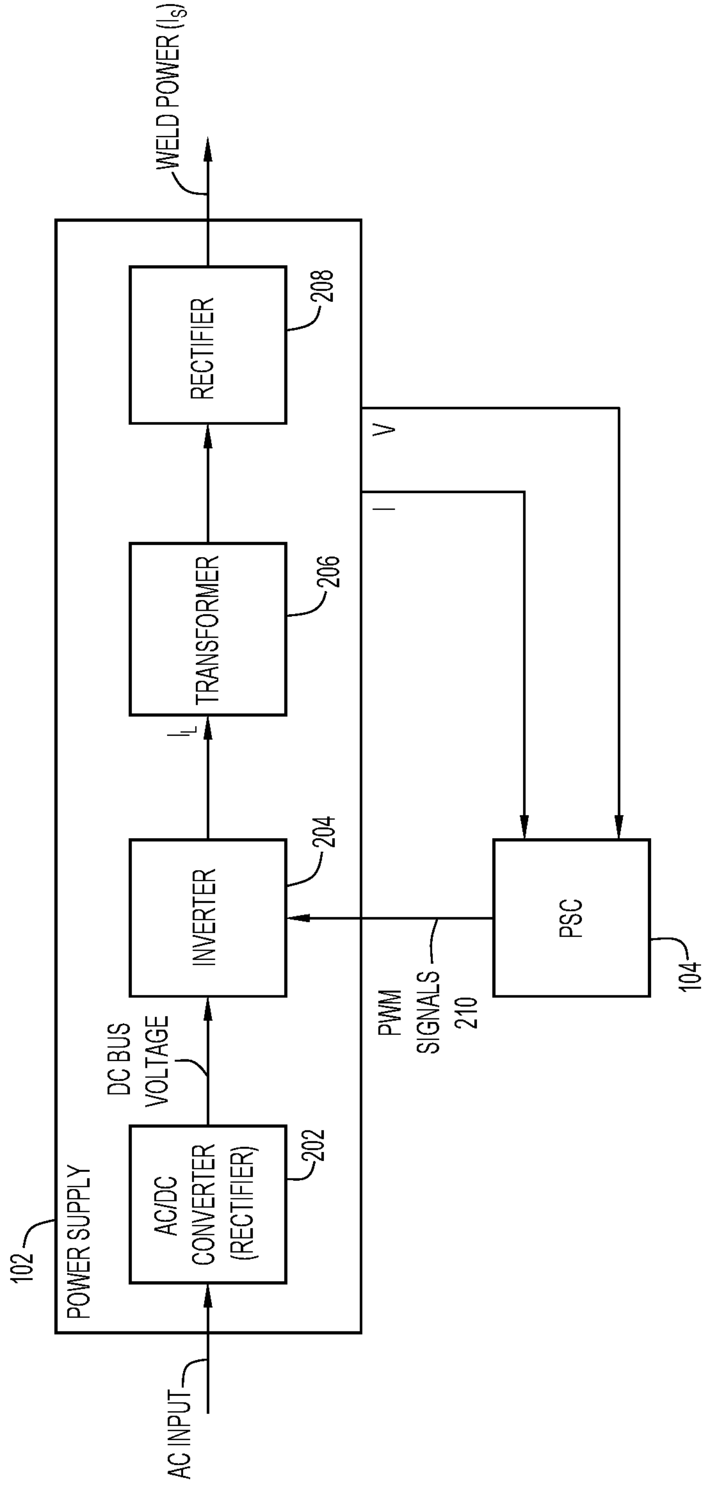
FIG. 2 is a block diagram of a power supply and a power supply controller (PSC) of the welding system, according to an example embodiment.

FIG. 2 is a block diagram of power supply 102 with PSC 104, according to an embodiment. Power supply 102 includes an AC/DC converter 202 to receive AC input power (e.g., from AC mains or a generator), a power inverter (referred to simply as an "inverter") 204, a high-frequency transformer 206, and a rectifier 208 coupled to one another. AC/DC converter 202 includes a diode rectifier to convert the AC input power to a constant, rectified DC voltage (also referred to as a DC "bus" voltage), and provide the DC bus voltage to an input of inverter 204. Under control of PSC 104, inverter 204, transformer 206, and rectifier 208 collectively operate as a weld process regulator to convert the DC bus voltage to a desired weld power supplied by power supply 102 for a welding operation.

Inverter 204 comprises a set of high-speed semiconductor switching devices (i.e., power switches) that are pulse width modulated (i.e., switched on and off at a switching frequency) responsive to pulse width modulation (PWM) waveforms 210 (also referred to as "PWM signals"), generated by PSC 104 and applied to control terminals of the switching devices, to convert the DC bus voltage to an AC (power) signal or waveform including a voltage and a primary current IL that flows into transformer 206. Such operation is referred to as "PWM operation" of inverter 204. Example switching frequencies may be in a range from 1 kHz-100 kHz, although other switching frequencies above and below this range may be used. Inverter 204 supplies the AC signal to transformer 206. Transformer 206 converts the voltage and current of the AC signal from inverter 204 to a transformed AC signal having desired levels of a voltage and a secondary current $I_S$ for the welding operation, and supplies the transformed AC signal to rectifier 208. Rectifier 208 rectifies the transformed AC signal to produce the weld power based on the secondary current $I_S$ and supplies the same to the welding process.

As shown in FIG. 2, power supply 102 includes a current sense point to provide to PSC 104 a sensed current I that represents secondary current $I_S$ or primary current $I_L$, for example, produced by the power supply 102. Power supply 102 also includes a voltage sense point to provide to PSC 104 a sensed voltage V representative of a voltage produced by the power supply (e.g., a voltage across the power supply terminals, the arc voltage, and the like). The sensed current and voltage represent current and voltage measurements (i.e., measured current and voltage) of the weld power, which provide real-time feedback from the welding process to PSC 104.

PSC 104 receives the current and voltage measurements. To control primary current $I_L$ (and correspondingly secondary current $I_S$) generated by power supply 102, PSC 104 controls or dynamically adjusts PWM waveforms 210 applied to inverter 204 based on a desired or target primary current (or secondary current), and based on the current and/or voltage measurements from the welding process. For example, PSC 104 may increase an on-time of cycles of PWM waveforms 210 applied to inverter 204 to increase primary/secondary current $I_L/I_S$, and vice versa. In this way, PSC 104 implements a sample-based feedback control loop to control PWM waveforms 210 based on the current and voltage measurements.

Figure 3:
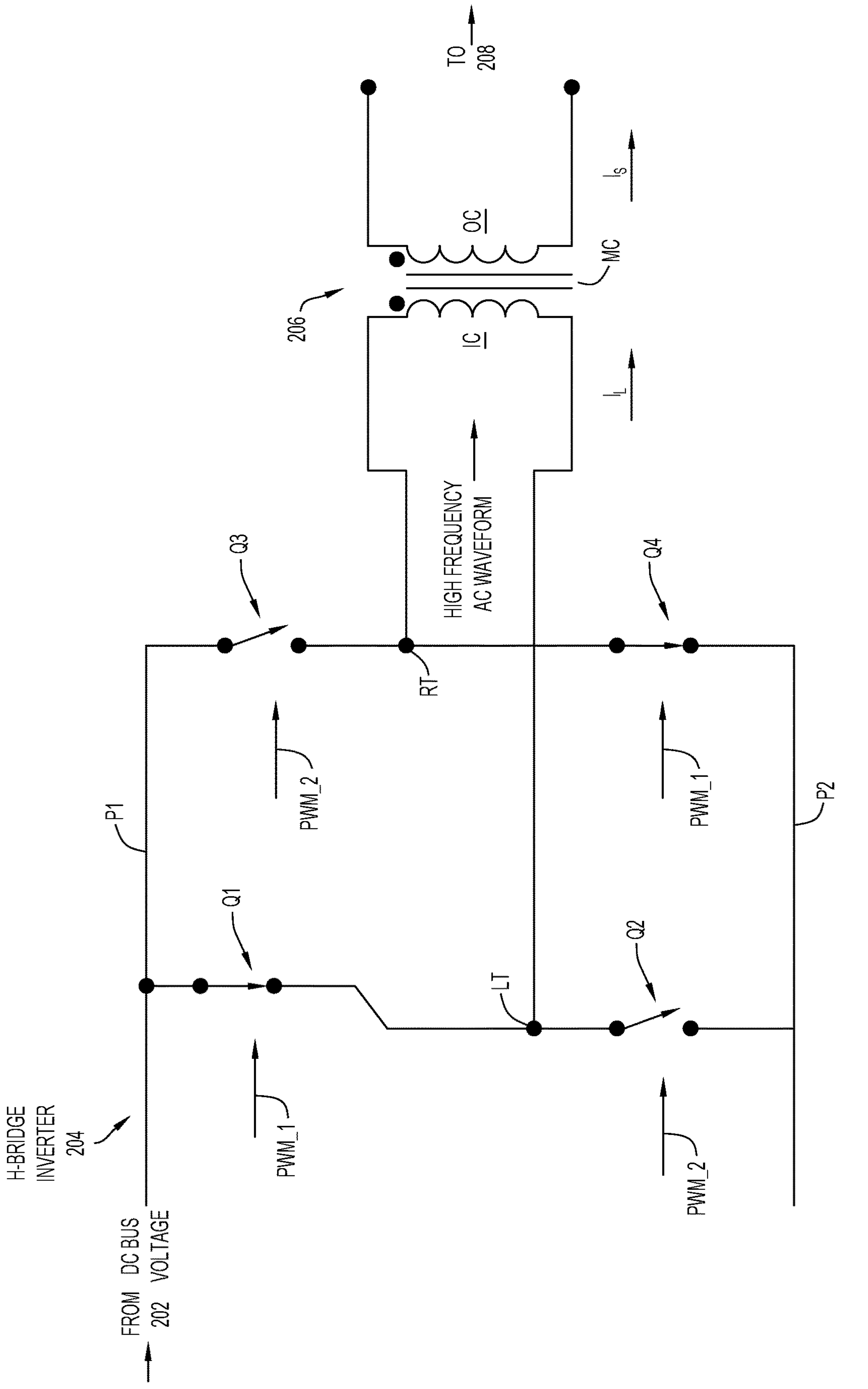
FIG. 3 is a circuit diagram of a power inverter and a transformer of the power supply, according to an example embodiment.

FIG. 3 is a simplified circuit diagram of inverter 204 and transformer 206, according to an embodiment. Transformer 206 includes an input coil IC coupled to an output of inverter 204, an output coil OC coupled to an input of rectifier 208 and electrically isolated from the input coil, and a magnetic core MC configured to magnetically couple the input coil IC to the output coil OC.

Inverter 204 includes a four-quadrant inverter, such as an H-bridge inverter, for example. In other examples, other types of inverters may be employed. Inverter 204 is sometimes referred to as a single "power block" of power supply 102. Inverter 204 includes input voltage rails P1 and P2 to receive the DC bus voltage generated by AC/DC converter 202, and also includes a set of high-frequency semiconductor (current) switches Q1-Q4 (more generally referred to as "power switches" or simply "switches") coupled to the input voltage rails and arranged in an H configuration. A given switch Q1 may be referred to simply as "Q1." Q1 and Q2 are connected in series with each other between input voltage rails P1 and P2 to form a first/left leg of the inverter, and (ii) Q3 and Q4 are connected in series with each other between the input voltage rails to form a second/right leg of the inverter. Q1 and Q2 are connected to each other at a left terminal LT, and Q3 and Q4 are connected to each other at a right terminal RT. Terminals LT, RT are respectively connected to opposing sides of input coil IC of transformer 206, while opposing sides of output coil OC of the transformer are coupled to rectifier 208. Q1-Q4 are controlled (i.e., turned ON or closed and turned OFF or opened) responsive to PWM waveforms 210 generated by PSC 104 and applied to respective control terminals of the switches. PWM waveforms 210 are typically configured as periodic square wave pulses, although other waveforms are possible.

In the example of FIG. 3, PWM waveforms 210 include PWM waveforms PWM_1 and PWM_2 (referred to simply as "PWM_1" and "PWM_2"), which respectively control first diagonal switch pair Q1, Q4 (together) and second diagonal switch pair Q2, Q3 (together). ON/OFF (e.g., high/low) states of PWM_1 (or PWM_2) turn ON/OFF first diagonal switch pair Q1, Q4 (or second diagonal switch pair Q2, Q3) to supply/not supply current from input voltage rails (P1, P2) to input coil IC of transformer 206 through left terminal LT (or through right terminal RT). In general, PWM_1 and PWM_2 alternately turn ON and OFF with respect to each other to alternately energize and de-energize diagonal switch pairs Q1, Q4 and Q2, Q3 to supply current to input coil IC of transformer 206 alternately via terminals LT and RT. During each on-time (i.e., pulse) of PWM_1, and during each on-time of PWM_2, inverter 204 supplies current to transformer 206. The example of FIG. 3 shows a PWM cycle in which Q1, Q4 are ON responsive to PWM_1, and Q2, Q3 are OFF responsive to PWM_2, in which case only terminal LT supplies current to transformer 206. A subsequent PWM cycle reverses the configuration. PSC 104 controls the PWM frequency, period, duty cycle, and on-time of each of PWM waveforms PWM_1 and PWM_2 to control an overall or composite PWM frequency, period, duty cycle, and on-time of the current supplied to transformer 206. The magnitude and frequency of the AC signal generated by inverter 204, and correspondingly the magnitude and frequency of the current and voltage of the weld power produced by power supply 102, is controlled responsive to the PWM waveforms.

In an example, each switch Qi may be implemented as a switching transistor, such as an insulated gate bipolar transistor (IGBT) having an emitter-collector current path that is turned ON or OFF responsive to a voltage applied to a gate (i.e., the control terminal) of the IGBT, for example. Alternatively, each switch Qi may be implemented as a field effect transistor (FET) (e.g., a metal oxide semiconductor (MOS) FET (MOSFET)) having a source-drain current path that is turned ON or OFF responsive to a voltage applied to a gate of the FET, for example. Each switch Qi may also include an internal diode that is connected in parallel with the controlled current path of the switch. Other types of power switches may be used, as would be appreciated by one of ordinary skill in the relevant arts.

As mentioned above, a conventional technique for controlling a PWM waveform computes and implements fixed on-times for cycles of the PWM once per cycle of the PWM waveform, which results in sluggish and inflexible responses to demands to change welding current during a welding or cutting operation. Embodiments presented herein to generate/control the PWM waveform overcome the aforementioned disadvantages and offer additional advantages described below. More specifically, the embodiments generate/control the PWM waveform to have an on-time that can be adjusted many times during each cycle in correspondence with/to accommodate demands on the primary/secondary current that change during each cycle. In other words, the embodiments provide repetitive, intra-cycle on-time adjustments. To implement such control, the embodiments repeat, multiple times during each cycle (i.e., per cycle), "determining-and-adjusting" operations that include (i) determining whether to adjust an on-time of a pulse generated during the cycle, and (ii) adjusting the on-time of the pulse in a direction indicated by each determining. The determining-and-adjusting occurs at a rate (e.g., at a mega sample per second rate) that exceeds the switching frequency (e.g., a kHz rate) of the PWM waveform, i.e., at a time interval that is less than a period of each cycle. As a result, the on-time may be adjusted (e.g., successively increased) many times during each cycle to accommodate changing current demands during the cycle, i.e., intra-cycle. The embodiments are described in further detail below.

Figure 4:
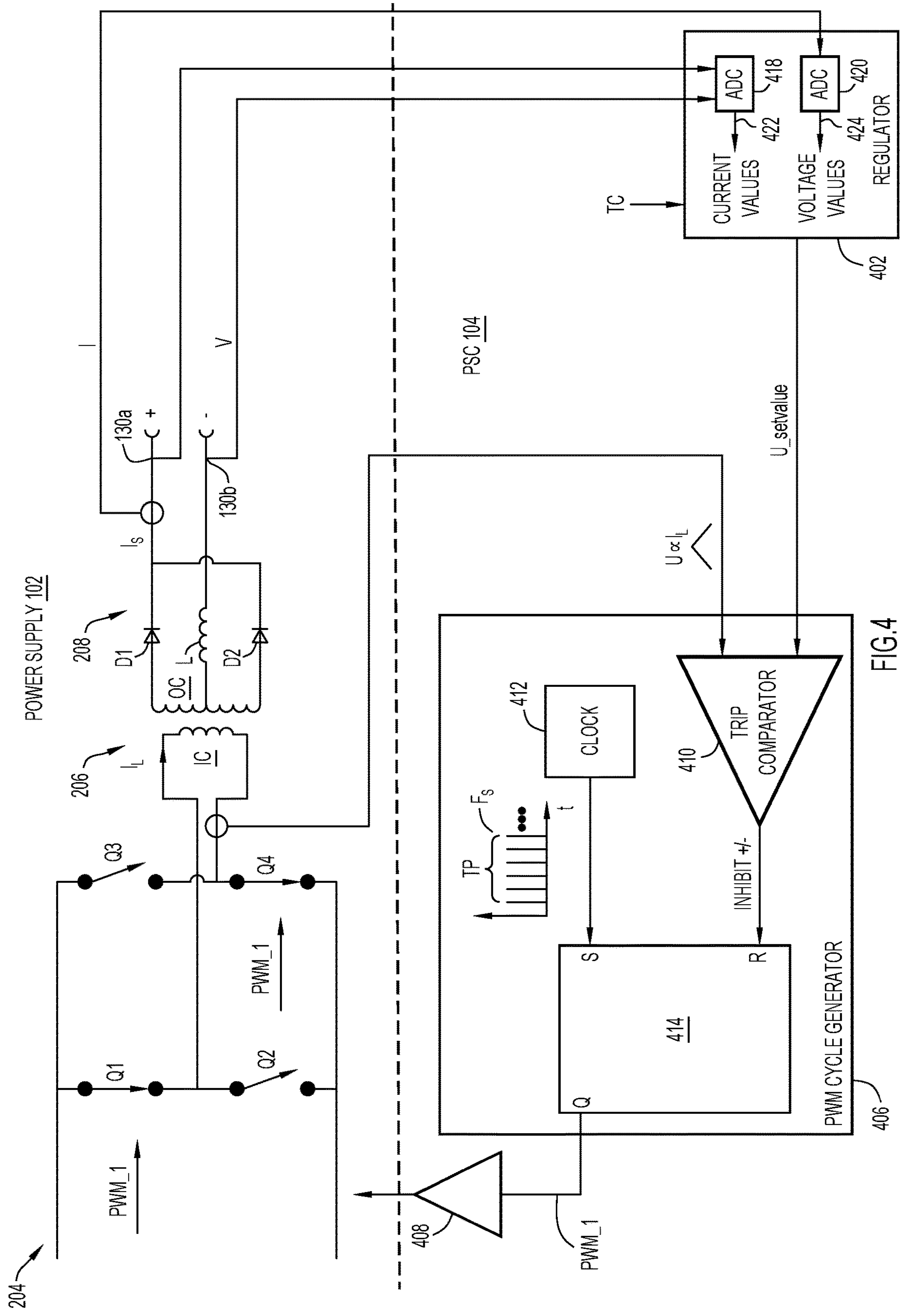
FIG. 4 is a diagram of the PSC according to an embodiment.

FIG. 4 is a diagram of PSC 104 configured to generate a PWM waveform, e.g., PWM_1, in accordance with the embodiment. FIG. 4 also shows further details of power supply 102, according to an embodiment. In the example, rectifier 208 includes rectifier diodes D1 and D2 having respective anodes coupled to opposing sides of output coil OC of transformer 206 and respective cathodes coupled to output terminal 130*a*. Rectifier 208 also includes an inductor L coupled to a center tap of output coil OC and input terminal 130*b*. A current sense point at output terminal 130*a* provides to PSC 104 current measurement I representative of secondary current $I_S$. A voltage sense point across output terminal 130*a* and input terminal 130*b* provides to PSC 104 voltage measurement V representative of the output voltage supplied by power supply 102. An intermediate voltage sense point at a low side of input coil IC of transformer 206 that is connected to switch Q4 provides to PSC 104 a voltage measurement referred to as a "representative signal U" that is indicative of primary current $I_L$ and secondary current $I_S$. For example, representative signal U may be proportional to primary current $I_L$ (e.g., $U \alpha I_L$) and may be proportional to secondary current $I_S$. In the example of FIG. 4, current measurement I, voltage measurement V, and representative signal U provided by power supply 102 to PSC 104 are all analog signals. In other examples, one or more of I, V, and U may be digital/digitized signals.

PSC 104 includes a regulator 402, a PWM cycle generator 406, and a driver 408 (i.e., a signal driver) coupled to one another and to power supply 102. PWM cycle generator 406 includes a comparator 410 (which may be an analog comparator), a clock 412, and a latch or flip-flop 414. At a high level, regulator 402 and PWM cycle generator 406 interact to generate PWM waveform PWM_1 and apply the PWM waveform to switches Q1 and Q4 of inverter 204 through driver 408. In particular, regulator 402 and PWM cycle generator 406 control an on-time or pulse width of each cycle of PWM waveform PWM_1, as described below. PSC 104 generates PWM waveform PWM_2 in substantially the same way as the PSC generates PWM waveform PWM_1, except that PWM waveform PWM_2 is phase-shifted with respect to PWM waveform PWM_1. Therefore, the ensuing description for generating PWM waveform PWM_1 shall suffice for PWM waveform PWM_2.

Regulator 402 includes an analog-to-digital converter (ADC) 418 and an ADC 420 to receive current measurement I and voltage measurement V representative of secondary current $I_S$ and the output voltage produced by power supply 102, as shown. In another arrangement, ADC 418 and ADC 420 may be external to PSC 104. ADC 418 samples current measurement I at a sample rate SR, to produce current values 422 at the sample rate, and provides the current values for use by PSC 104. Sample rate SR may be in the MHz range, for example. Similarly, ADC 420 samples voltage measurement V at the sample rate SR, to produce voltage values 424 at the sample rate, and provides the voltage values for use by PSC 104. Current values 422 and voltage values 424 represent digitized current and voltage measurements, which provide real-time feedback from the welding process to PSC 104. The current values 422 and the voltage values 424 may also be referred to as "current samples" and "voltage samples," respectively.

Regulator 402 also receives a target current value TC (also referred to as a current "set point") that represents a target current for primary current $I_L$. The target current value TC may be configured on welding system 100 through an external source (not shown), or may be varied responsive to demands on primary current $I_L$, for example.

PSC 104 performs operations described next at sample rate SR, which is greater than a switching frequency of PWM waveform PWM_1. The operations may be performed at a rate other than sample rate SR, provided that the rate is greater than the switching frequency. At sample rate SR, regulator 402 processes current values 422, voltage values 424, and the target current value TC using a proportional-integral-derivative (PID) algorithm, for example, to produce values of a signal U_setvalue (also referred to as a "trip value") at the sample rate, and provides the values of U_setvalue to a first input of comparator 410 (also referred to as a "trip comparator 410"). The values of U_setvalue may be voltage values, for example. When regulator 402 employs the PID algorithm, the regulator may operate as a proportional integral (PI) controller or regulator, for example.

Each value of U_setvalue (i.e., "U_setvalue") is indicative of whether to adjust primary current $I_L$, so as to drive the same toward the target current represented by target current value TC. When current values 422<TC, regulator 402 produces successive values of U_setvalue that increase one to the next. On the other hand, when current values 422>TC, regulator 402 produces successive values of U_setvalue that decrease one to the next. When current values 422~TC, regulator 402 produces successive values of U_setvalue that are constant.

Because sample rate SR is greater than the switching frequency of PWM waveform PWM_1, regulator 402 produces multiple values of U_setvalue per cycle of the PWM waveform. Stated otherwise, during each cycle of PWM waveform PWM_1, regulator 402 determines/computes N values of U_setvalue that are separated one from the next by a time interval $t_i$ (1/SR) that is less than a period P of each cycle, where $N=P/t_i$.

A second input of comparator 410 receives representative signal U α $I_L$ supplied by the intermediate voltage sense point on input coil IC of transformer 206. Comparator 410 acts as an analog comparator to continuously compare successive values of U_setvalue to successive values of representative signal U α $I_L$ to produce compare result INHIBIT+/−. That is, INHIBIT+/− represents a result of the compare operation performed by comparator 410. When U>U_setvalue, INHIBIT+/− is high (e.g., a logic 1), which indicates to decrease primary current $I_L$. Alternatively, when U≤U_setvalue, INHIBIT+/− is low (e.g., a logic 0), which indicates to increase primary current $I_L$.

Flip-flop 414 includes a reset input R, a set input S, and a latch output Q. Comparator 410 applies INHIBIT+/− to reset input R of flip-flop 414. Clock 412 generates a train of short trigger pulses (referred to collectively and individually as "TP") and applies the trigger pulses to set input S of flip-flop 414. Trigger pulses TP have a frequency $F_S$ that represents the switching frequency (where $F_S$<SR) and a period ($1/F_S$) of each cycle of PWM waveform PWM_1. That is, trigger pulses TP have a pulse repetition interval (PRI) (measured from a rising edge of one trigger pule pulse to a rising edge of a next trigger pulse) equal to the period.

A rising edge of each trigger pulse TP latches output Q high. On the other hand, a rising edge of INHIBIT+/− applied to reset input R resets output Q, i.e., latches output Q low. Thus, output Q of flip-flop 414 produces successive cycles of PWM waveform PWM_1 with period $1/F_S$ responsive to successive trigger pulses TP. Additionally, an on-time or pulse width of each cycle varies in response to the timing of trigger pulses TP in relation to activity of INHIBIT+/−. The start of a trigger pulse TP triggers a cycle of PWM waveform PWM_1, and starts an on-time (i.e., turns ON a pulse) of the cycle. Subsequently, while INHIBIT+/− is low during the cycle, the pulse of the cycle remains ON. In contrast, a rising edge of INHIBIT+/− turns OFF the pulse before the cycle ends to establish a final or total on-time or pulse width of the cycle. The process repeats with the start of a next trigger pulse TP, and so on.

In the example described above, current values 422, target current value TC, representative signal U, and U_setvalue are representative of or based on primary current $I_L$. In another example, current values 422, target current value TC, representative signal U, and U_setvalue may be representative of or based on secondary current $I_S$, rather than primary current $I_L$.

Figure 5:
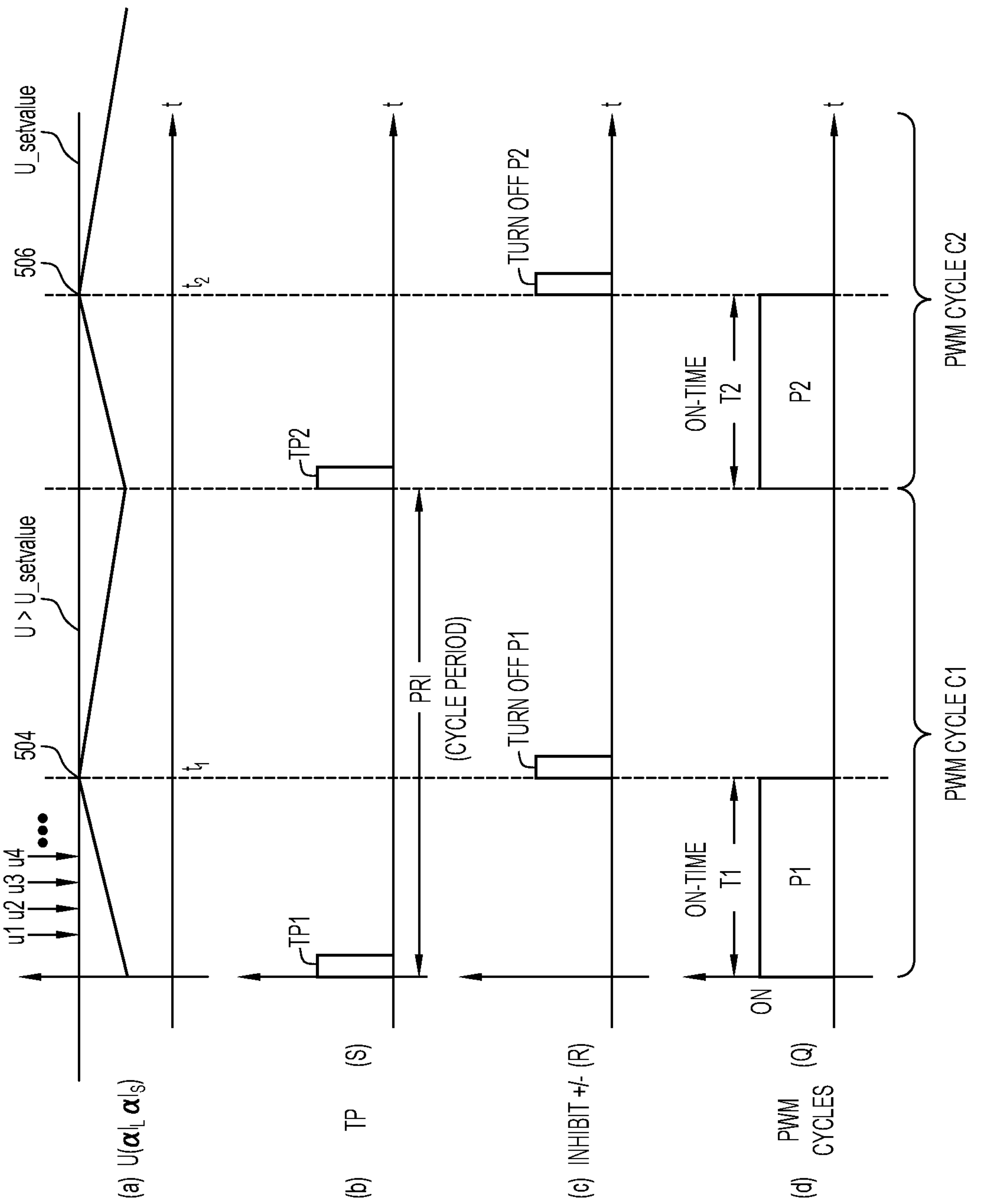
FIG. 5 shows example timing waveforms for various signals associated with the PSC of FIG. 4.

FIG. 5 shows timing waveforms for various signals of PSC 104 taken from FIG. 4. The timing waveforms span two cycles C1, C2 of PWM waveform PWM_1 generated in response to two trigger pulses TP TP1, TP2. Specifically, FIG. 5 shows the following example timing waveforms (a)-(d) from top-to-bottom in the figure:

a. Representative signal U (a $I_L$, $I_S$) and values of U_setvalue over cycles C1, C2 (shown in bottom timing waveform (d)). U_setvalue comprises many values u1, u2, u3, and so on, computed at sample rate SR during each cycle. In the example of FIG. 5, the values u1, u2, u3, and so on, are constant across each cycle. In other examples, the values may vary, e.g., increase or decrease, during each cycle.
b. Trigger pulses TP1, TP2 applied to set input S that trigger cycles C1, C2.
c. INHIBIT+/− applied to reset input R. INHIBIT+/− is high only when U>U_setvalue.
d. Cycles C1, C2.

Referring to FIG. 5 and also to FIG. 4, trigger pulse TP1 triggers cycle C1 and turns ON pulse P1 for the cycle. That is, TP1 starts an on-time of cycle C1. While values of U increase with time up to time t1 (504), each U≤U_setvalue, so INHIBIT+/− remains low continuously, which keeps pulse P1 ON. Then, at time t1, U>U_setvalue, which transitions INHIBIT+/− from low-to-high, which turns OFF pulse P1. This sets the final on-time of cycle C1 to T1. The aforementioned operations repeat responsive to next trigger pulse TP2, which triggers next pulse P2 of cycle C2. While U increases with time up to time t2 (506), U≤U_setvalue, so pulse P2 remains ON. At time t2, U>U_setvalue, so INHIBIT+/− transitions from low-to-high, which turns OFF pulse P2 and sets the final on-time of cycle C2 to T2.

Figure 6:
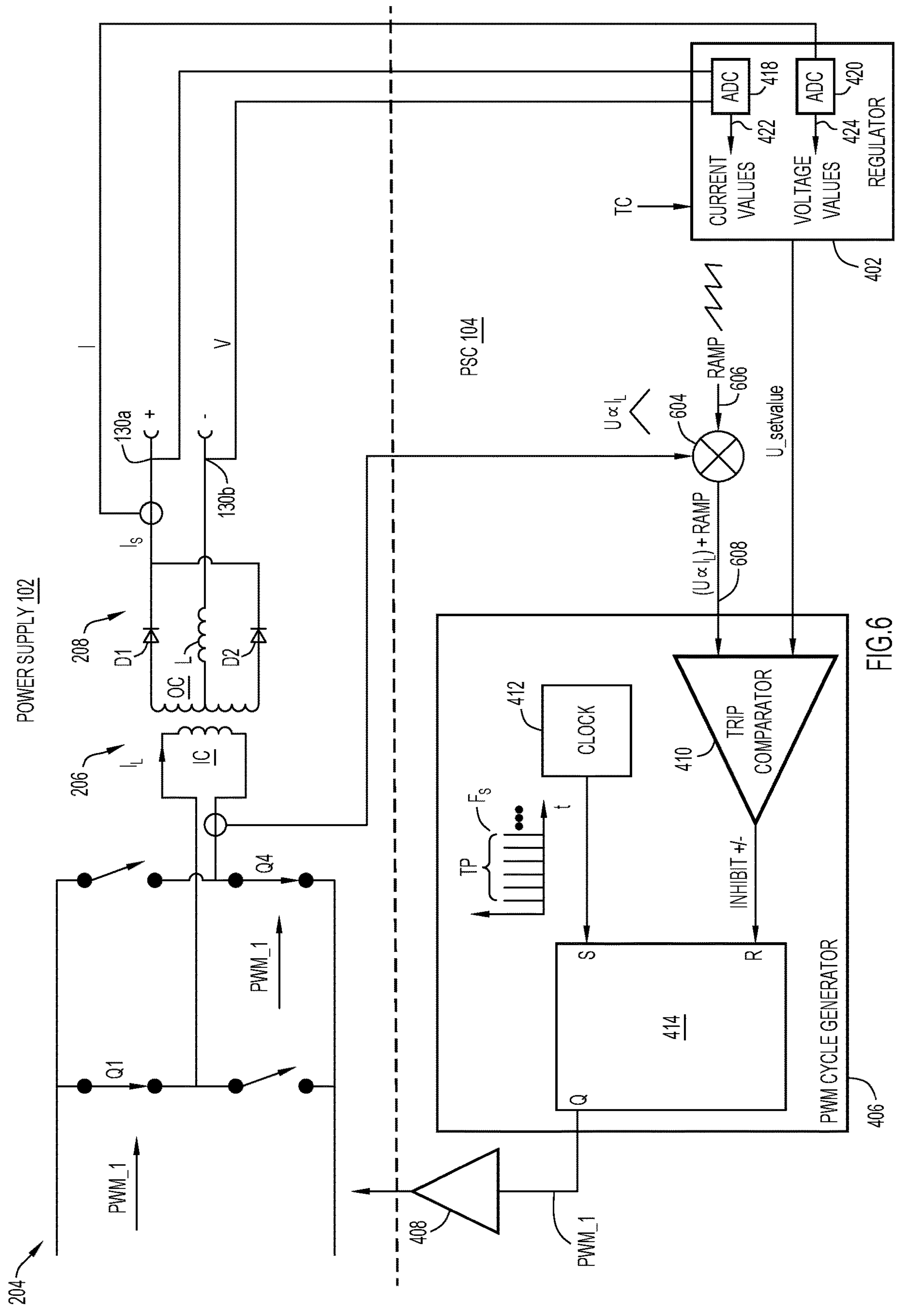
FIG. 6 is a diagram of the PSC according to another embodiment.

FIG. 6 is a diagram of PSC 104 according to another embodiment. The embodiment of FIG. 6 is substantially similar to the embodiment of FIG. 4, except for the following differences. The embodiment of FIG. 6 includes a summer 604 that adds a ramp waveform 606 to representative signal U, to produce a U+ramp waveform 608. Ramp waveform 606 may include a sawtooth waveform having a period equal to the period of PWM waveform PWM_1, for example. Summer 604 applies U+ramp waveform 608 to the second input of comparator 410, which compares U_setvalue to the U+ramp waveform, to produce INHIBIT+/−. Inclusion of ramp waveform 606 adds stability to the process described above for controlling the on-time during each cycle of PWM waveform PWM_1.

Figure 7:
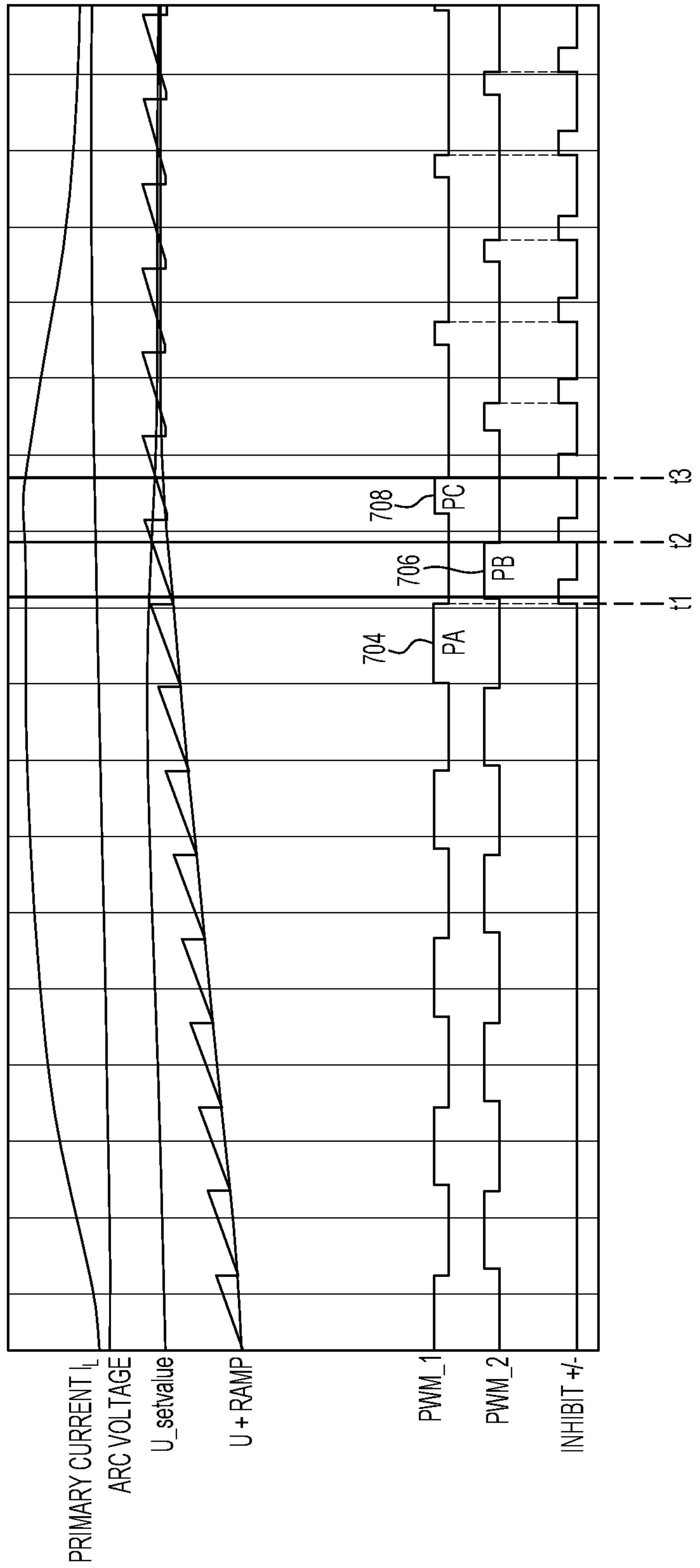
FIG. 7 shows further example timing waveforms associated with the PSC.

FIG. 7 shows example timing waveforms (from top-to-bottom of FIG. 7) for primary current $I_L$, measured arc voltage, U_setvalue, U+Ramp, PWM_1, PWM_2, and Inhibit+/−, spanning multiple cycles of PWM_1 and PWM_2. U_setvalue is updated, and a determination to increase or decrease an on-time is made, many times during each cycle of PWM_1 and PWM_2. Up to time t1, all values of U+Ramp<U_setvalue over successive cycles of PWM_1 and PWM_2, which maximizes on-times for PWM_1 and PWM_2 during those cycles. The following events are shown at or after time t1:

a. During cycle 704 for PWM_1, successive values of U_setvalue decrease until, at t1, U+Ramp>U_setvalue, which triggers a rising edge of INHIBIT+/−, which turns OFF a pulse PA (i.e., terminates an on-time) for that cycle. INHIBIT+/− reacts to a downward slope of U_setvalue during cycle 704.
b. During cycle 706 for PWM_2, successive values of U_setvalue decrease until, at time t2, U+Ramp>U_setvalue, which triggers a rising edge of INHIBIT+/−, which turns OFF a pulse PB for that cycle.
c. During cycle 708 for PWM_3, U_setvalue repeatedly decreases until, at t3, U+Ramp>U_setvalue, which triggers a rising edge of INHIBIT+/−, which turns OFF a pulse PC for that cycle.

In a scenario in which target current value TC suddenly increases (i.e., "jumps-up" in value) during a cycle (to reflect a demand to suddenly increase primary current $I_L$ or secondary current $I_S$), U_setvalue responds accordingly, and will also suddenly increase during the cycle to meet the demand. The sudden increase in U_setvalue relative to representative signal U during the cycle will cause the on-time to increase during the cycle. This will cause the primary and secondary currents (and thus representative signal U) to increase over subsequent cycles and eventually "catch-up" to and exceed U_setvalue, at which point INHIBIT+/−will trigger to shorten on-times during the subsequent cycles. Additionally, U_setvalue may decrease over the subsequent cycles to limit the primary and secondary currents.

Operations described above in connection with FIGS. 4-7 may be summarized as follows. PSC 104 generates cycles of a PWM waveform, e.g., PWM_1, at a switching frequency of the PWM waveform. Each cycle turns ON a pulse (i.e., starts an on-time for the pulse). Subsequent to turning ON the pulse in each cycle, PSC 104 repeatedly adjusts the on-time during each cycle in accordance with demands to adjust primary current $I_L$. PSC adjusts the on-time at a rate that is greater than the switching frequency of the PWM waveform. Stated otherwise, during each cycle of the PWM waveform, PSC determines whether to adjust, and then adjusts accordingly, the on-time multiple times at a time interval that is less than a period of the cycle. To do this, PSC repeatedly performs the following set of operations during each cycle:

a. Based on current values 216 and target current value TC, determine whether to adjust the on-time in order to adjust primary current $I_L$, correspondingly. More specifically, determine whether to increase or decrease the on-time to increase or decrease primary current $I_L$, correspondingly. Next operations (b) and (c) adjust the on-time as directed by (i.e., in a direction directed by) determine operation (a).
b. When it is determined to increase the on-time, increase values of U_setvalue to a condition where U_setvalue>U, which ensures that the pulse remains ON (by operation of comparator 410 and flip-flop 414 as described above), and thus increases the on-time of the pulse, and increases primary current $I_L$.
c. When it is determined to decrease the on-time, decrease values of U_setvalue to a condition where U_setvalue≤U, which turns OFF the pulse (by operation of comparator 410 and flip-flop 414 as described above), and thus decreases the on-time, and decreases primary current $I_L$.

The operations described above control the on-time during the cycle without actually computing a value for the on-time. Rather, during each cycle, the operations repeatedly determine/evaluate whether to adjust the on-time multiple times and then adjust the on-time during the cycle based on each determination.

Figure 8:
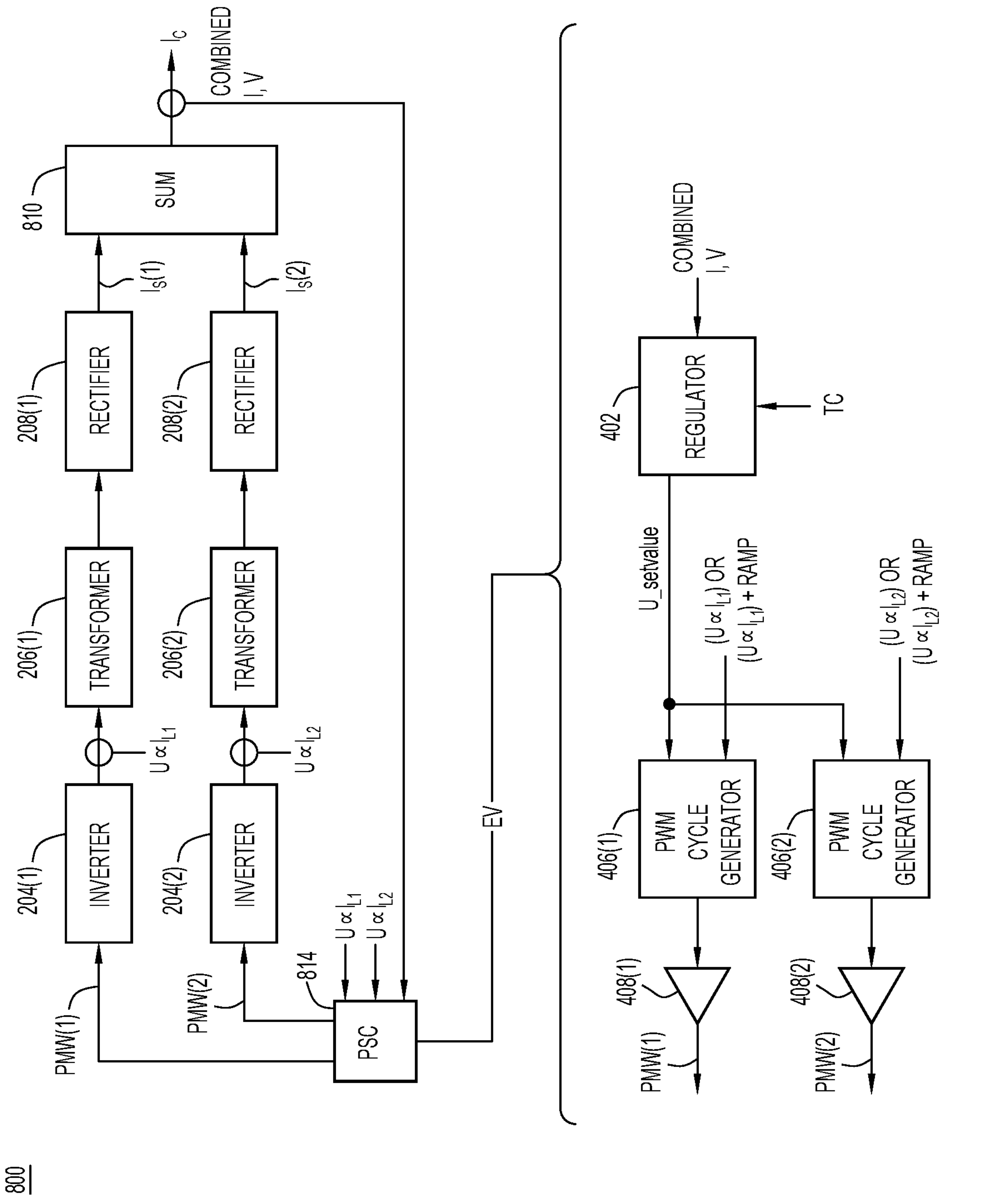
FIG. 8 is a block diagram of a portion of an example welding system that employs multiple inverters or power blocks controlled by a single feedback control loop.

FIG. 8 is a block diagram of a portion of an example welding system 800 that employs multiple inverters or power blocks controlled by a single feedback control loop. Specifically, welding system 800 includes multiple inverters 204(1), 204(2) that drive multiple transformers 206(1), 206(2) responsive to multiple PWM waveforms PWM(1), PWM(2) to produce multiple secondary currents $I_S$(1), $I_S$(2) through rectifiers 208(1), 208(2), respectively. In other examples, more than two inverters may be used. Welding system 800 includes a summer 810 to sum secondary currents $I_S$(1), $I_S$(2) into a combined current $I_C$ and a combined output voltage for a welding or cutting operation, and provides a combined current measurement and a combined output voltage measurement to a PSC 814. In addition, intermediate sample points at transformers 206(1), 206(2) provide to PSC 814 representative signals U $\alpha$ $I_L$ and U $\alpha$ $I_{L2}$. PSC 814 operates similarly to PSC 104 to generate PWM waveforms PWM(1), PWM(2) based on the aforementioned signals and target current value TC.

An example of PSC 814 is shown in an expanded view EV of FIG. 8. PSC 814 includes regulator 402, PWM cycle generators 406(1), 406(2), and drivers 408(1), 408(2). ADC 418 and ADC 420 of regulator 402 digitize the combined current measurement and the combined output voltage measurement to produce current values representative of combined current $I_C$ and voltage values representative of the combined output voltage. PWM cycle generators 406(1), 406(2) are each configured similarly to PWM cycle generator 406 of FIG. 4, except that respective clocks in respective ones of the PWM cycle generators generate respective trigger pulses TP that are staggered or offset in phase with respect to each other. In operation, regulator 402 derives U_setvalue based on the current values for combined current $I_C$ and TC, and provides U_setvalue to PWM cycle generators 406(1), 406(2), in parallel. PWM cycle generators 406(1), 406(2) respectively generate PWM waveforms PWM(1), PWM(2) as described above in connection with FIG. 4, except that each cycle of PWM waveform PWM(1) is offset in phase with respect to each cycle of PWM waveform PWM(2) due to the staggered trigger pulses TP. That is, PWM waveforms PWM(1) and PWM(2) are interleaved in time.

Figure 9:
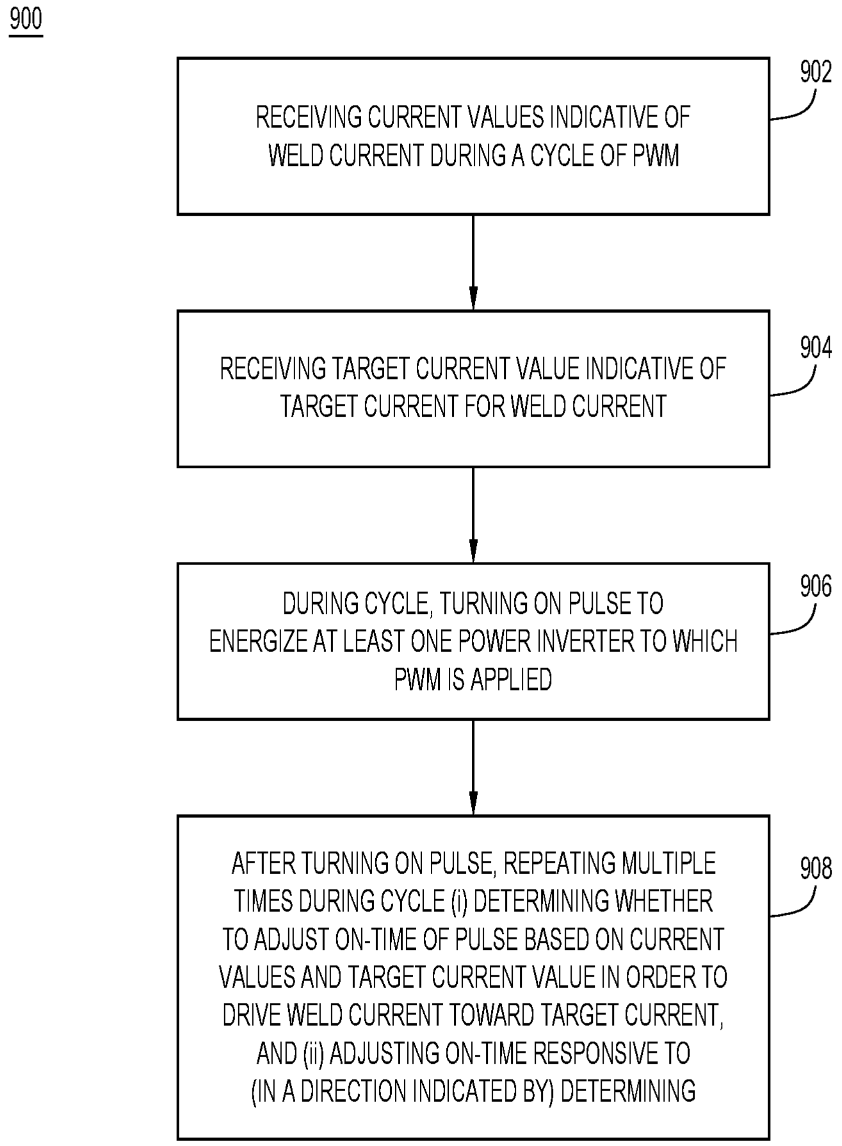
FIG. 9 is a flowchart of an example method of controlling an on-time or pulse width of PWM in a welding system.

FIG. 9 is a flowchart of an example method 900 of controlling an on-time or pulse width of PWM applied to at least one power inverter (i.e., one or more power inverters) to generate a weld current for cutting or welding.

902 includes receiving current values (e.g., current values 422) indicative of the weld current during a cycle of the PWM.

904 includes receiving a target current value (e.g., target current value TC) indicative of a target current for the weld current.

906 includes, during the cycle (e.g., at a start of the cycle), turning ON a pulse to energize the at least one power inverter.

908 includes, after turning ON the pulse, repeating multiple times during the cycle (i.e., at a time interval that is less than a period of the cycle):

a. Determining whether to adjust an on-time of the pulse based on the current values and the target current value in order to drive the weld current toward the target current. For example, determining may include determining whether to increase or decrease the on-time.
b. Adjusting the on-time responsive to determining. For example, adjusting may include (i) when it is determined to increase the on-time, increasing the on-time by not turning OFF the pulse, and (ii) when it is determined to decrease the on-time, decreasing the on-time by turning OFF the pulse.

Thus, 908 includes repeating, multiple times (i) determining whether to adjust the on-time during the cycle, and (ii) adjusting the on-time responsive to each determining.

Once the pulse is turned OFF, the pulse may remain OFF until a start of a next cycle. In other words, adjusting may include adjusting the on-time by increasing the on-time (i.e., keeping the pulse ON responsive to each determining to increase the on-time), until adjusting the on-time includes turning OFF the pulse responsive to determining to decrease the on-time, after which the pulse remains turned OFF.

Determining whether to adjust the on-time may include:

a. Computing a set value or trip value (e.g., U_setvalue) indicative of whether to increase or decrease the on-time based on the current values and the target current value.
b. Comparing the set value to a representative signal (e.g., U or U+Ramp) indicative of the weld current.

Adjusting the on-time responsive to determining may include:

a. When the representative signal does not exceed the set value, increasing the on-time by not turning OFF the pulse.
b. When the representative signal exceeds the set value, decreasing the on-time by turning OFF the pulse.

Method 900 further includes, for each of successive cycles of the PWM, repeating turning on the pulse, and repeating the multiple times (i) determining, and (ii) adjusting to drive the weld current to the target current.

In a single power inverter embodiment, the one or more power inverters include only one power inverter. In a multiple power inverter embodiment, the one or more power inverters include multiple power inverters configured to generate multiple currents responsive to the PWM. The multiple power inverter embodiment includes summing the multiple currents to produce the weld current as a combined current, and providing the PWM to each of the multiple power inverters based on the combined current.

Figure 10:
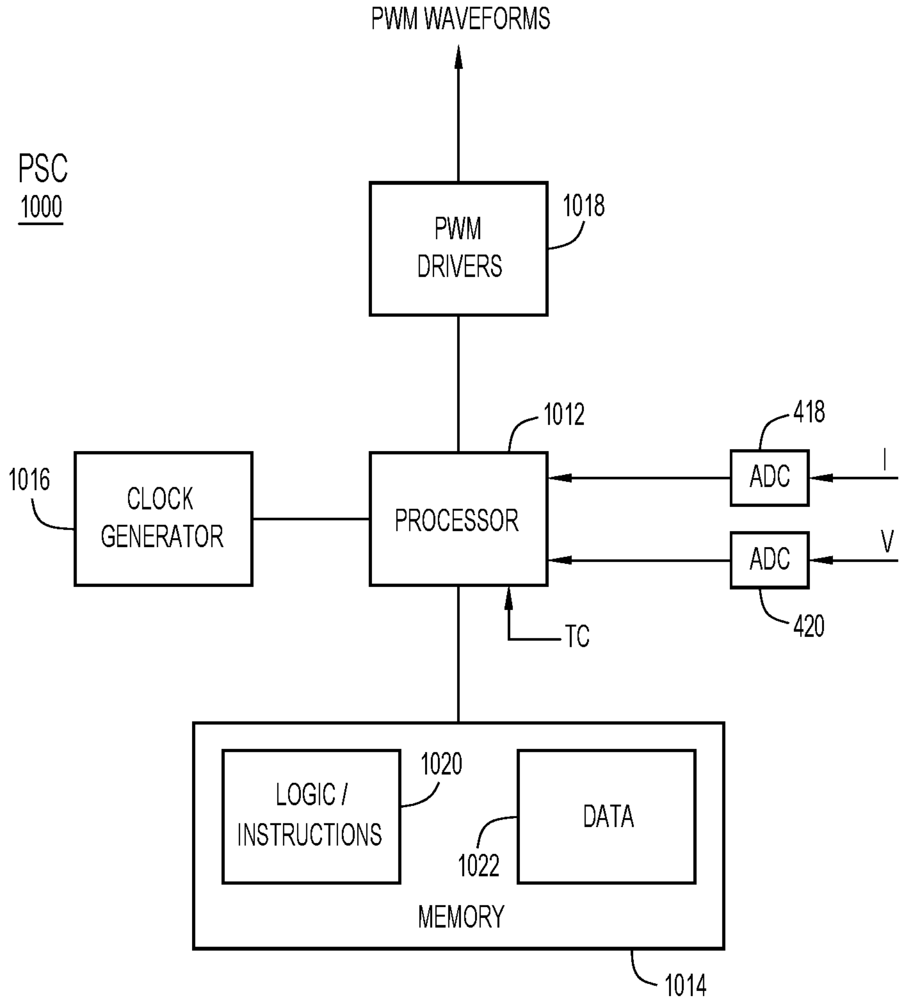
FIG. 10 is a block diagram of an example PSC configured to perform the embodiments presented herein.

With reference to FIG. 10, there is a block diagram of an example PSC (also referred to as a "controller") 1000. PSC 1000 may represent PSC 104 and PSC 814, for example. PSC 1000 includes a processor 1012 (e.g., a microcontroller) (which may be implemented in hardware, software, or a combination thereof), a memory 1014, a clock generator 1016, PWM drivers 1018 (e.g., drivers 408, 408(1), and 408(2)), ADC 418, and ADC 420 coupled with each other. PSC 104 receives sensed voltage and current (i.e., voltage and current measurements), a target current value, and generates PWM signals or waveforms (e.g., PWM waveforms 210, PWM_1, PWM_2, PWM(1), and PWM(2)). Memory 1014 stores non-transitory computer readable program instructions/logic instructions 1020 that, when executed by processor 1012, cause the controller to perform the operations described herein. For example, memory 1014 may store program instructions that executed/control power increase event triggered ramp up/increase of the AC signal. Memory 1014 also stores data 1022 used and produced by processor 1012. Clock generator 1016 generates clocks and timing signals used to drive other components of PSC 104. In embodiments, components of PSC 104 may include electronic circuitry such as, for example, programmable logic circuitry, field-programmable gate arrays (FPGA), or programmable logic arrays (PLA) to execute the computer readable program instructions, which may include microcode, firmware, and so on.

In some aspects, the techniques described herein relate to a method of controlling pulse width modulation (PWM) applied to at least one power inverter to generate a weld current for cutting or welding, including: receiving current values indicative of the weld current during a cycle of the PWM; receiving a target current value indicative of a target current for the weld current; during the cycle, turning ON a pulse to energize the at least one power inverter; and after turning ON the pulse, repeating multiple times during the cycle: determining whether to adjust an on-time of the pulse based on the current values and the target current value in order to drive the weld current toward the target current; and adjusting the on-time responsive to determining.

In some aspects, the techniques described herein relate to a method, wherein: repeating the multiple times includes repeating the multiple times at a time interval that is less than a period of the cycle.

In some aspects, the techniques described herein relate to a method, wherein: determining includes determining whether to increase or decrease the on-time; and adjusting includes: when it is determined to increase the on-time, increasing the on-time by not turning OFF the pulse; and when it is determined to decrease the on-time, decreasing the on-time by turning OFF the pulse.

In some aspects, the techniques described herein relate to a method, further including: for each of successive cycles of the PWM, repeating (i) turning ON the pulse, and (ii) repeating the multiple times in order to drive the weld current to the target current.

In some aspects, the techniques described herein relate to a method, wherein determining includes: processing the target current value and the current values using a proportional-integral-derivative (PID) algorithm.

In some aspects, the techniques described herein relate to a method, wherein: turning ON the pulse includes turning ON the pulse at a start of the cycle.

In some aspects, the techniques described herein relate to a method, wherein: adjusting includes adjusting the on-time until adjusting the on-time includes turning OFF the pulse responsive to determining to decrease the on-time.

In some aspects, the techniques described herein relate to a method, wherein determining includes: computing a set value indicative of whether to increase or decrease the on-time based on the current values and the target current value; and comparing the set value to a representative signal indicative of the weld current, wherein adjusting includes adjusting based on results of comparing.

In some aspects, the techniques described herein relate to a method, wherein adjusting includes: when the representative signal does not exceed the set value, increasing the on-time by not turning OFF the pulse; and when the representative signal exceeds the set value, decreasing the on-time by turning OFF the pulse.

In some aspects, the techniques described herein relate to a method, wherein the at least one power inverter includes multiple power inverters configured to generate multiple currents responsive to the PWM, and the method further includes: summing the multiple currents to produce the weld current; and providing the PWM to each of the multiple power inverters.

In some aspects, the techniques described herein relate to an apparatus including: at least one power inverter of a welding system; and a controller configured to perform controlling pulse width modulation (PWM) applied to the at least one power inverter to generate a weld current for cutting or welding by: receiving current values indicative of the weld current during a cycle of the PWM; receiving a target current value indicative of a target current for the weld current; during the cycle, turning ON a pulse to energize the at least one power inverter; and after turning ON the pulse, repeating multiple times during the cycle: determining whether to adjust an on-time of the pulse based on the current values and the target current value in order to drive the weld current toward the target current; and adjusting the on-time responsive to determining.

In some aspects, the techniques described herein relate to an apparatus, wherein the controller is further configured to perform: repeating the multiple times includes repeating the multiple times at a time interval that is less than a period of the cycle.

In some aspects, the techniques described herein relate to an apparatus, wherein: the controller is configured to perform determining by determining whether to increase or decrease the on-time; and the controller is configured to perform adjusting by: when it is determined to increase the on-time, increasing the on-time by not turning OFF the pulse; and when it is determined to decrease the on-time, decreasing the on-time by turning OFF the pulse.

In some aspects, the techniques described herein relate to an apparatus, wherein the controller is further configured to perform: for each of successive cycles of the PWM, repeating (i) turning ON the pulse, and (ii) repeating the multiple times in order to drive the weld current to the target current.

In some aspects, the techniques described herein relate to an apparatus, wherein: the controller is configured to perform processing the target current value and the current values using a proportional-integral-derivative (PID) algorithm.

In some aspects, the techniques described herein relate to an apparatus, wherein: the controller is configured to perform turning ON the pulse by turning ON the pulse at a start of the cycle.

In some aspects, the techniques described herein relate to an apparatus, wherein: the controller is configured to perform adjusting by adjusting the on-time until adjusting the on-time includes turning OFF the pulse responsive to determining to decrease the on-time.

In some aspects, the techniques described herein relate to an apparatus, wherein the controller is configured to perform determining by: computing a set value indicative of whether to increase or decrease the on-time based on the current values and the target current value; and comparing the set value to a representative signal indicative of the weld current, wherein the controller is configured to perform adjusting by adjusting based on results of comparing.

In some aspects, the techniques described herein relate to an apparatus, wherein the controller is configured to perform adjusting by: when the representative signal does not exceed the set value, increasing the on-time by not turning OFF the pulse; and when the representative signal exceeds the set value, decreasing the on-time by turning OFF the pulse.

In some aspects, the techniques described herein relate to an apparatus, wherein the at least one power inverter includes multiple power inverters configured to generate multiple currents responsive to the PWM, and the apparatus further includes: a summer to sum the multiple currents to produce the weld current; and the controller is configured to perform providing the PWM to each of the multiple power inverters.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of controlling pulse width modulation (PWM) applied to at least one power inverter to generate a weld current for cutting or welding, comprising:

receiving current values indicative of the weld current during a cycle of the PWM;

receiving a target current value indicative of a target current for the weld current;

during the cycle, turning ON a pulse to energize the at least one power inverter; and after turning ON the pulse, repeating multiple times during the cycle at a rate that exceeds a switching frequency of the PWM:

determining whether to adjust an on-time of the pulse based on the current values and the target current value in order to drive the weld current toward the target current; and adjusting the on-time responsive to determining.

2. The method of claim 1, wherein:

repeating the multiple times includes repeating the multiple times at a time interval that is less than a period of the cycle.

3. The method of claim 1, wherein:

determining includes determining whether to increase or decrease the on-time; and adjusting includes:

when it is determined to increase the on-time, increasing the on-time by not turning OFF the pulse; and when it is determined to decrease the on-time, decreasing the on-time by turning OFF the pulse.

4. The method of claim 1, further comprising:

for each of successive cycles of the PWM, repeating (i) turning ON the pulse, and (ii) repeating the multiple times in order to drive the weld current to the target current.

5. The method of claim 1, wherein determining includes:

processing the target current value and the current values using a proportional-integral-derivative (PID) algorithm.

6. The method of claim 1, wherein:

turning ON the pulse includes turning ON the pulse at a start of the cycle.

7. The method of claim 1, wherein:

adjusting includes adjusting the on-time until adjusting the on-time includes turning OFF the pulse responsive to determining to decrease the on-time.

8. The method of claim 1, wherein determining includes:

computing a set value indicative of whether to increase or decrease the on-time based on the current values and the target current value; and comparing the set value to a representative signal indicative of the weld current, wherein adjusting includes adjusting based on results of comparing.

9. The method of claim 8, wherein adjusting includes:

when the representative signal does not exceed the set value, increasing the on-time by not turning OFF the pulse; and when the representative signal exceeds the set value, decreasing the on-time by turning OFF the pulse.

10. The method of claim 1, wherein the at least one power inverter includes multiple power inverters configured to generate multiple currents responsive to the PWM, and the method further comprises:

summing the multiple currents to produce the weld current; and providing the PWM to each of the multiple power inverters.

11. An apparatus comprising:

at least one power inverter of a welding system; and a controller configured to perform controlling pulse width modulation (PWM) applied to the at least one power inverter to generate a weld current for cutting or welding by:

receiving current values indicative of the weld current during a cycle of the PWM;

receiving a target current value indicative of a target current for the weld current;

during the cycle, turning ON a pulse to energize the at least one power inverter; and after turning ON the pulse, repeating multiple times during the cycle at a rate that exceeds a switching frequency of the PWM:

determining whether to adjust an on-time of the pulse based on the current values and the target current value in order to drive the weld current toward the target current; and adjusting the on-time responsive to determining.

12. The apparatus of claim 11, wherein the controller is further configured to perform:

repeating the multiple times includes repeating the multiple times at a time interval that is less than a period of the cycle.

13. The apparatus of claim 11, wherein:

the controller is configured to perform determining by determining whether to increase or decrease the on-time; and the controller is configured to perform adjusting by:

when it is determined to increase the on-time, increasing the on-time by not turning OFF the pulse; and when it is determined to decrease the on-time, decreasing the on-time by turning OFF the pulse.

14. The apparatus of claim 11, wherein the controller is further configured to perform:

for each of successive cycles of the PWM, repeating (i) turning ON the pulse, and (ii) repeating the multiple times in order to drive the weld current to the target current.

15. The apparatus of claim 11, wherein:

the controller is configured to perform processing the target current value and the current values using a proportional-integral-derivative (PID) algorithm.

16. The apparatus of claim 11, wherein:

the controller is configured to perform turning ON the pulse by turning ON the pulse at a start of the cycle.

17. The apparatus of claim 11, wherein:

the controller is configured to perform adjusting by adjusting the on-time until adjusting the on-time includes turning OFF the pulse responsive to determining to decrease the on-time.

18. The apparatus of claim 11, wherein the controller is configured to perform determining by:

computing a set value indicative of whether to increase or decrease the on-time based on the current values and the target current value; and comparing the set value to a representative signal indicative of the weld current, wherein the controller is configured to perform adjusting by adjusting based on results of comparing.

19. The apparatus of claim 18, wherein the controller is configured to perform adjusting by:

when the representative signal does not exceed the set value, increasing the on-time by not turning OFF the pulse; and when the representative signal exceeds the set value, decreasing the on-time by turning OFF the pulse.

20. The apparatus of claim 11, wherein the at least one power inverter includes multiple power inverters configured to generate multiple currents responsive to the PWM, and the apparatus further comprises:

a summer to sum the multiple currents to produce the weld current; and the controller is configured to perform providing the PWM to each of the multiple power inverters.

* * * * *